April 10, 1934.  J. H. OETJEN  1,954,681
MOUNTING BLOCK FOR GAS ANALYSIS CELLS
Filed Sept. 22, 1932
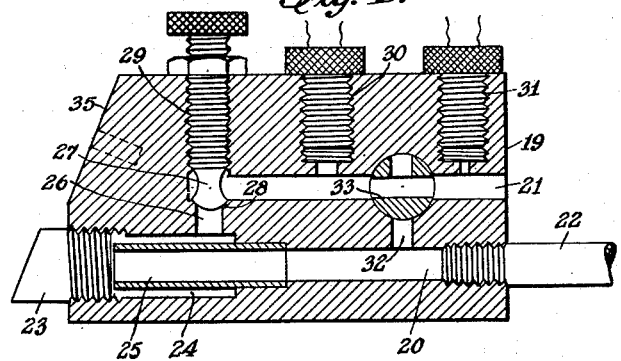
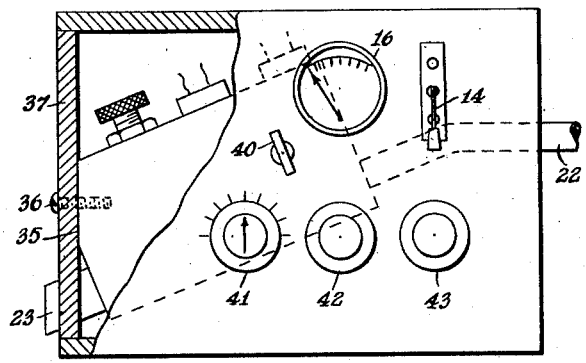
INVENTOR
JOHN H. OETJEN
BY
ATTORNEY Patented Apr. 10, 1934

1,954,681

UNITED STATES PATENT OFFICE 1,954,681

MOUNTING BLOCK FOR GAS ANALYSIS CELLS

John H. Oetjen, Maplewood, N. J., assignor to Charles Engelhard, Inc., Newark, N. J., a corporation of New Jersey Application September 22, 1932, Serial No. 634,330

10 Claims. (Cl. 73—51)

The invention relates to gas analysis apparatus, and more especially to an improved mounting block for the thermally conductive analysis cells utilized therein.

The invention has for an object the provision of a suitable block member for receiving a thermally conductive analysis cell or cells, and having means whereby a cell may be exposed at will either to a gas of known composition, as air, or to the gas to be analyzed.

A further object of the invention resides in the provision of means for controlling the rate of flow of the gas or air through the block; and still another object of the invention is to so design the block that the same may conveniently be positioned to effect drainage therefrom of any moisture condensed out of the gases passing through the said block.

In carrying out the invention, a block member is provided with a through longitudinal bore or duct and to one end of which is adapted to be connected a pressure supply of gas for analysis, the other end being open to the atmosphere to exhaust the gas flowing through said block. Provision is made, also, to by-pass the gas to a second bore, communicating at one end with the atmosphere or with a gas of known composition and at the other end with the said longitudinal bore in advance of its outlet end and behind the outlet of an ejector tube fitted therein. A valve device in this second bore serves to regulate the flow of gas through the same as it is drawn past the active portion of a thermally conductive gas analysis cell mounted in the block. A three-way valve, moreover, is included in the by-pass connection so that a said cell may be exposed either to air or to the gas to be analyzed.

For comparison purposes, a further and standard thermally conductive analysis cell may be mounted in the block between the by-pass valve and the inlet of the second bore for exposure to air drawn therethrough.

The nature of the invention, however, will best be understood when described in connection with the accompanying drawing, in which:

Fig. 1 is a longitudinal section through the novel block utilized for mounting the gas analysis cells, and shows also the means for manipulating the flow of gases through the block.

Fig. 2 is a part vertical section and part front elevation illustrating the novel manner of securing the block in position within a housing therefor and whereby any moisture will be drained from the passageways thereof.

Referring to the drawing, provision is made for mounting one or more gas analysis cells within a single mounting block 19 and in such a manner that if two cells are utilized—one a standard cell and the other adapted for measuring—both may be simultaneously exposed to a current of air or other gas of standard or known composition; or, the measuring cell only be exposed to the gas to be analyzed thereby and the cell to the standard gas. Thus, the block is provided with two main bores 20 and 21, respectively, the former passing entirely through the block and communicating at the one end with a pressure supply pipe or hose 22 for furnishing the gas to be analyzed. At its opposite end a pipe or hose 23 makes connection with the atmosphere.

Bore 20 at its outlet end is counterbored or enlarged as at 24, and a sleeve or nozzle member 25 is fitted therein to serve as an ejector for the purpose hereinafter set forth.

The other bore 21 is disposed parallel to the bore 20 and communicates at its one end, corresponding to the gas supply end of bore 20, with the atmosphere. At its opposite end it communicates, through a port 26, with the counterbored portion 24 of the bore 20 and behind the outlet of the nozzle element 25. Thus, under the aspirating action induced by the flow of gas through the said nozzle, air may be drawn through the bore 21 so long as free communication is afforded therethrough.

Furthermore, the rate of flow through the bore may be controlled, for example, by means of a valve element 27 adapted to cooperate with a seat 28 and adjustable relatively thereto as in having its stem threaded into a vertically tapped opening 29 of the block.

The particular cells utilized are of any well known or special design comprising threaded bushings which are designed to be fitted, for example into further vertically tapped openings 30 and 31, respectively, of the block and communicating at their lower ends with the said bore 21. By this expedient, not only may the cells be substantially and readily secured in position but their active ends will be exposed to fluid flowing through said bore as in making the analysis determinations.

A by-pass connection 32, furthermore, is provided between the two bores 20 and 21, and a three-way valve 33 is included therein whereby it becomes possible to expose not only both of the cell elements simultaneously to a flow of air or other standard gas through the bore 21, and as indicated by the position shown in Fig. 1 of the drawing, but also the one cell to the gas introduced into the bore 20 and the other to air. Thus, when the valve 33 is moved to the left to a position at right angles to that illustrated in Fig. 1, the air supplied to the cell will be cut off and communication will be afforded between the two bores 20 and 21 to cause the gas which is to be analyzed to pass through the portion of bore 21 beyond said valve and cause the particular cell to be exposed to this gas. By adjusting valve element 27, the flow past a cell may be controlled to the desired rate.

In the passage of these gases through a block of the nature aforesaid, there is always a possibility of moisture condensing out of the same and collecting in the bores and other passageways and thus tending to give erratic determinations in the analyses made therewith.

To insure against accumulation of such moisture, one of the faces, as the face 35 of the block may be beveled or inclined to the axes of the bores 20 and 21, as shown, and tapped at this point to receive an attaching screw 36 whereby the block as a whole may be secured fixedly to the wall, for example, of a housing 37 for the block. This positions the mounting block as a whole at an angle to the horizontal so that the said bores 20 and 21 assume a tilted or inclined position toward the outlet; and any moisture deposited in either of these bores will eventually drain out under the action of the outlet pipe 23.

As indicated, further, this assembly admits of conveniently bringing externally of the casing an operating handle or finger piece 40 for the three-way valve 33 and also controlling knobs 41, 42 and 43 for resistances (not shown); and a switch element 14 may also be located exteriorly of the casing as well as a galvanometer 16, these, together with the resistances, being associated with the cells in effecting an analysis, for example in the manner more fully set forth in my copending application for U. S. Letters Patent Serial No. 626,465, filed July 30, 1932.

I claim:

1. A mounting block for thermally conductive gas analysis cells, said block having two main bores and a connecting cross-bore, the one main bore passing therethrough and adapted to receive at one end a supply of gas to be analyzed and to discharge the same at its other end, and the other main bore adapted for communication at one end with a gas of known composition and at its opposite end through the cross-bore with the through bore near its discharge end, the block being further provided with an opening communicating with the second-named main bore and adapted to receive an analysis cell and also with a by-pass connection between the two said main bores, and a three-way valve located in said by-pass connection whereby the cell may be exposed either to the gas of known composition or to the gas to be analyzed.

2. A mounting block for thermally conductive gas analysis cells, said block having two parallel and horizontally disposed main bores and a connecting cross-bore, the one main bore passing therethrough and adapted to receive at one end a supply of gas to be analyzed and to discharge the same at its other end, and the other main bore adapted for communication at one end with a gas of known composition and at its opposite end through the cross-bore with the through bore near its discharge end, the block being vertically tapped to provide an opening communicating with the second-named main bore and adapted to receive an analysis cell, said block having also a by-pass connection between the two said main bores, and a three-way valve located in said by-pass connection whereby the cell may be exposed either to the gas of konwn composition or to the gas to be analyzed.

3. A mounting block for thermally conductive gas analysis cells, said block having two main bores and a connecting cross-bore, the one main bore passing therethrough and adapted to receive at one end a supply of gas to be analyzed and to discharge the same at its other end, and the other main bore adapted for communication at one end with a gas of known composition and at its opposite end through the cross-bore with the through bore near its discharge end, the block being further provided with an opening communicating with the second-named main bore and adapted to receive an analysis cell and also with a by-pass connection between the two said main bores, means to control the flow through the said second-named main bore, and a three-way valve located in said by-pass connection whereby the cell may be exposed either to the gas of known composition or to the gas to be analyzed.

4. A mounting block for thermally conductive gas analysis cells, said block having two main bores and a connecting cross-bore, the one main bore passing therethrough and adapted to receive at one end a supply of gas to be analyzed and to discharge the same at its other end, and the other main bore adapted for communication at one end with a gas of known composition and at its opposite end through the cross-bore with the through bore near its discharge end, the block being further provided with an opening communicating with the second-named main bore and adapted to receive an analysis cell, a stem threaded into said block having a valve piece adapted to seat in the said cross-bore to control the flow of gaseous medium through the second-named main bore and there being provided also a by-pass connection between the two said main bores, and a three-way valve located in said by-pass connection whereby the cell may be exposed either to the gas of known composition or to the gas to be analyzed.

5. A mounting block for thermally conductive gas analysis cells, said block having two main bores and a connecting cross-bore, the one main bore passing therethrough and adapted to receive at one end a supply of gas to be analyzed and to discharge the same at its other end, and the other main bore adapted for communication at one end with a gas of known composition and at its opposite end through the cross-bore with the through bore near its discharge end, the block being further provided with two openings communicating with the second-named main bore and each of which openings is adapted to receive an analysis cell, there being also provided a by-pass connection between the two said main bores and entering the second-named main bore between the two cells, and a three-way valve located in said by-pass connection whereby both cells may be exposed simultaneously to the gas of known composition or one cell to said gas and the other to the gas to be analyzed.

6. A mounting block for thermally conductive gas analysis cells, said block having two main bores and a connecting cross-bore, the one main bore passing therethrough and adapted to receive at one end a supply of gas to be analyzed and to discharge the same at its other end, an ejector member at the outer end of the second-named main bore and the latter being enlarged at said end about said member, and the other main bore communicating at one end with a gas of known composition and at its opposite end through the cross-bore with the enlarged portion of the first-named bore behind the discharge end of the ejector member, the block being further provided with an opening communicating with the second-named main bore and adapted to receive an analysis cell and also with a by-pass connection between the two said main bores, and a three-way valve located in said by-pass connection whereby the cell may be exposed either to the gas of known composition or to the gas to be analyzed.

7. A mounting block for thermally conductive gas analysis cells, said block having two main bores and a connecting cross-bore, the one main bore passing therethrough and adapted to receive at one end a supply of gas to be analyzed and to discharge the same at its other end, and the other main bore adapted for communication at one end with a gas of known composition and at its opposite end through the cross-bore with the through bore near its discharge end, a threaded bushing for retaining a gas analysis cell, the block being tapped to receive said bushing and having communication with the second-named main bore, there being provided also a by-pass connection between the two said main bores, and a three-way valve located in said by-pass connection whereby the cell may be exposed either to the gas of known composition or to the gas to be analyzed.

8. A mounting block for thermally conductive gas analysis cells, said block having two main bores and a connecting cross-bore, the one main bore passing therethrough and adapted to receive at one end a supply of gas to be analyzed and to discharge the same at its other end, and the other main bore adapted for communication at one end with a gas of known composition and at its opposite end through the cross-bore with the through bore near its discharge end, the block being further provided with an opening communicating with the second-named main bore and adapted to receive an analysis cell and also with a by-pass connection between the two said main bores, a three-way valve located in said by-pass connection whereby the cell may be exposed either to the gas of known composition or to the gas to be analyzed, and the block having a beveled attachment surface at its outlet end whereby said block may be secured to a vertical surface to cause the main bores to be inclined downwardly toward said outlet end.

9. A mounting block for thermally conductive gas analysis cells, said block having two main bores and a connecting cross-bore, the one main bore passing therethrough and adapted to receive at one end a supply of gas to be analyzed and to discharge the same at its other end, and the other main bore adapted for communication at one end with a gas of known composition and at its opposite end through the cross-bore with the through bore near its discharge end, the block being further provided with an opening communicating with the second-named main bore and adapted to receive an analysis cell and also with a by-pass connection between the two said main bores, a three-way valve located in said by-pass connection whereby the cell may be exposed either to the gas of known composition or to the gas to be analyzed, a casing for the block, said block having a beveled attachment surface at its outlet end, and means to attach the same to a side wall of the casing whereby when said block is secured the main bores will be inclined downwardly toward said outlet end.

10. A mounting block for thermally conductive gas analysis cells, said block having two main bores and a connecting cross-bore, the one main bore passing therethrough and adapted to receive at one end a supply of gas to be analyzed and to discharge the same at its other end, and the other main bore adapted for communication at one end with a gas of known composition and at its opposite end through the cross-bore with the through bore near its discharge end, the block being further provided with an opening communicating with the second-named main bore and adapted to receive an analysis cell and also with a by-pass connection between the two said main bores, a three-way valve located in said by-pass connection whereby the cell may be exposed either to the gas of known composition or to the gas to be analyzed, a casing for the block, said block having a beveled attachment surface at its outlet end, means to attach the same to a side wall of the casing whereby when said block is secured the main bores will be inclined downwardly toward said outlet end, and a shaft for the three-way valve extending through a wall of the casing for operation of said valve.

JOHN H. OETJEN.